Sept. 26, 1967  H. R. BLACKWELL ET AL  3,343,449
VEILING LUMINANCE MEASUREMENT DEVICE
Original Filed Jan. 11, 1962  3 Sheets-Sheet 1
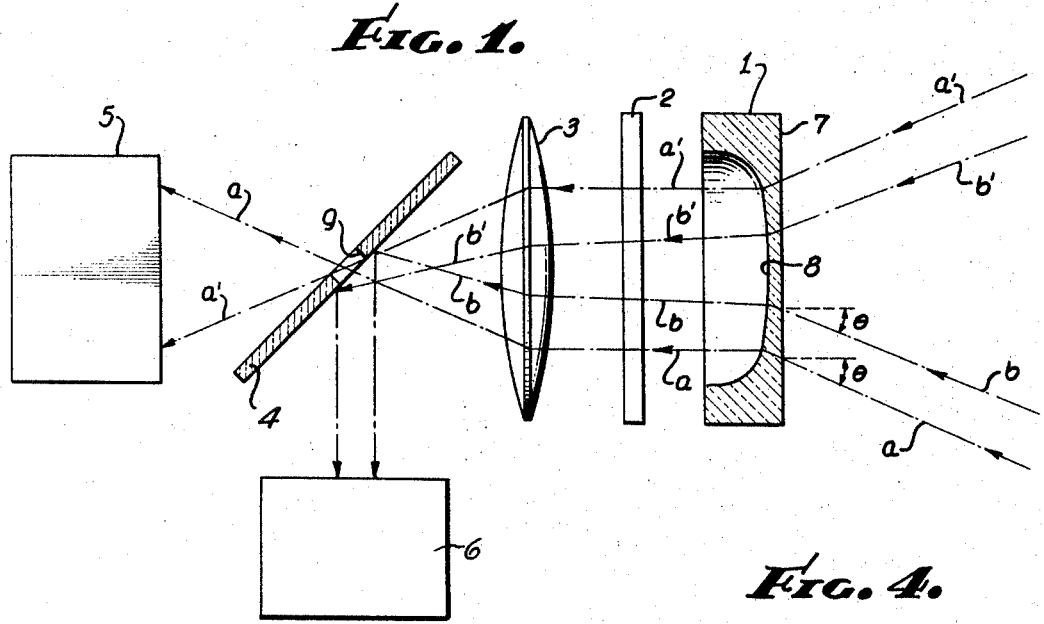
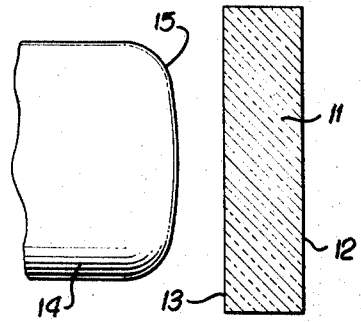
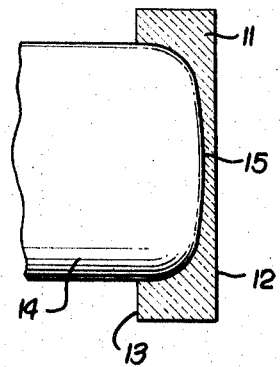
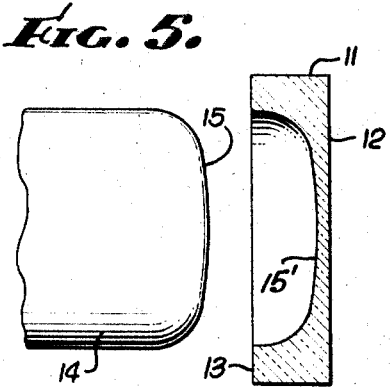
HAROLD RICHARD BLACKWELL
GLENN A. FRY
MILDRED M. PRITCHARD,
Executrix of Estate of
B. S. PRITCHARD
 INVENTORS.
By
Miketta, Glenny, Poms & Smith
 ATTORNEYS.

Sept. 26, 1967     H. R. BLACKWELL ET AL     3,343,449
VEILING LUMINANCE MEASUREMENT DEVICE
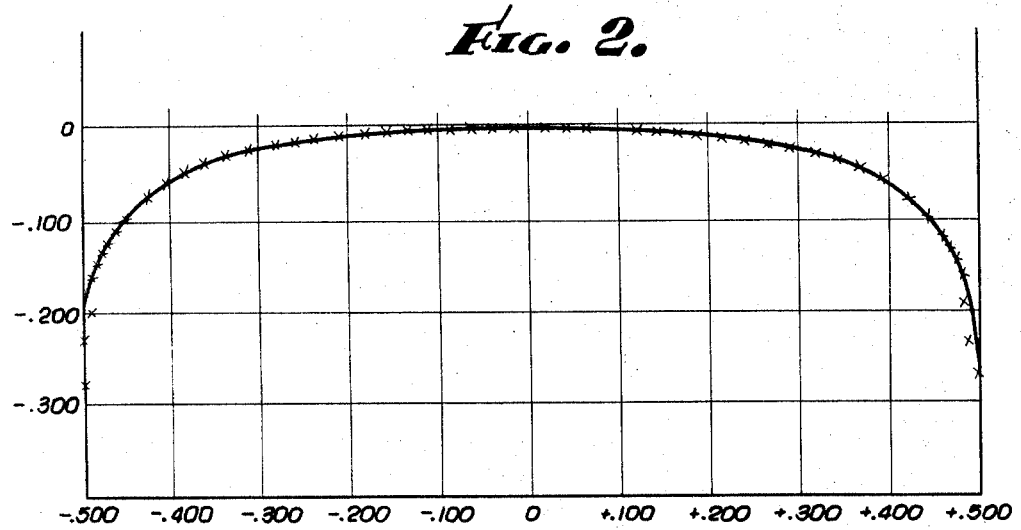
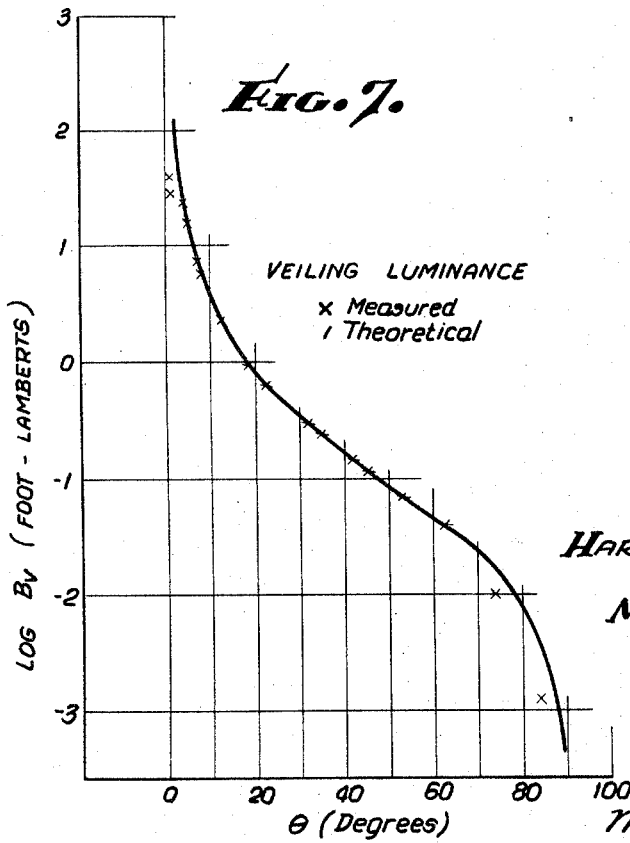
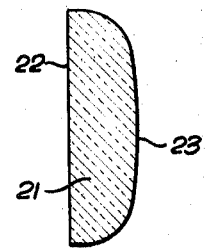
HAROLD RICHARD BLACKWELL
GLENN A. FRY
MILDRED M. PRITCHARD
Executrix of Estate of
B. S. PRITCHARD
INVENTORS.
By
Miketta, Glenny, Poms & Smith
ATTORNEYS.

United States Patent Office 3,343,449
Patented Sept. 26, 1967

3,343,449
VEILING LUMINANCE MEASUREMENT DEVICE
Harold Richard Blackwell and Glenn A. Fry, Columbus, Ohio, and Benjamin S. Pritchard, deceased, late of Columbus, Ohio, by Mildred M. Pritchard, executrix, Columbus, Ohio, assignors to Photo Research Corporation, Los Angeles, Calif., a corporation of California
Continuation of application Ser. No. 165,706, Jan. 11, 1962. This application Feb. 7, 1966, Ser. No. 526,324
5 Claims. (Cl. 88—23)

This application is a continuation of pending application Ser. No. 165,706, filed Jan. 11, 1962, now abandoned.

In general, the present invention relates to a means and method for the measurement of the effect of glare sources or bright spots in the visual field on the human eye. More specifically, the present invention involves the measurement of the veiling luminance effect of glare sources.

It is recognized that one of the basic determinants of the performance of the human eye is its sensitivity to contrast of luminance between the subject matter being observed and the field surrounding the subject matter. For example, both the speed and the accuracy of the eye in the performance of visual tasks depends upon its sensitivity to such contrasts. Consequently, all lighting installations such as illumination of roads, offices and factories must consider the effect of the lighting on the contrast between observed subject matter and background subject matter. For example, where small parts are assembled in a factory production line, such contrast has a marked effect on speed and efficiency.

Luminance or brightness is strictly defined as the luminous intensity of any surface in a given direction. In popular terminology, luminance refers to the light sent out by a surface or the brightness of a surface. The contrast of luminance between the subject matter being observed, i.e., the target, and the field surrounding the target, i.e., the target's background, may be defined by the following equation:

(1) $$C = \frac{B_T - B_B}{B_B}$$

Where C is the contrast, $B_T$ is the target luminance and $B_B$ is the background luminance. With such equation, it is relatively simple to measure experimentally the sensitivity and resulting performance of the eye for a specific contrast, e.g., a specific white spot on a specific uniform gray background.

However, the usual visual environment *never* presents uniform background luminance. The usual visual environment contains a large number of areas of different luminance. Consequently the problem arises of measuring eye sensitivity and resulting performance under non-uniform background luminance. Of course, only when this information is obtained, is it possible to control and produce the proper illumination. For example, to what degree is the sensitivity of the eye to a first white spot on a gray background affected by the presence of a second white spot on the background in spaced relation to the first white spot? The loss of eye sensitivity and resulting performance due to such luminance non-uniformities or glare sources in the visual field is known as "disability glare." The effect of glare sources on the eye has received extensive consideration both theoretically and experimentally because of its great importance in achieving proper illumination. However, to date, the prior art has no simple means of directly measuring disability glare except under controlled experimental conditions in the laboratory.

In theory, the effect of a glare source on eye performance is attributed to the stray light directed within the eye. Such theory led to the "veiling luminance" effect in order to show how glare sources caused disability glare. The effects of glare sources may be described as though a veiling luminance were added to both the target and the background in the vicinity of the target. Such veiling luminance increases the effective luminance and decreases the effective contrast just as a superposed real luminance would do. Note that equation (1) defining contrast shows that increasing the target luminance and background luminance equally will decrease contrast.

Experimentally the following relation has been determined between a glare source and the resulting veiling luminance:

(2) $$B_v = \frac{9.2E}{\theta(1.5 + \theta)}$$

Where $B_v$ = veiling luminance produced by a glare source in foot-lamberts;
$E$ = illumination striking the plane of the pupil of the eye in lumens/ft.$^2$ measured in the plane of the pupil of the eye; and
$\theta$ = the angle between the line of sight and said glare source in degrees.

Another slightly different experimental relationship between the glare source and veiling luminance is as follows:

(3) $$B_v = \frac{9.2E}{\theta^2}$$

It should be noted that Equation 2 is preferred to Equation 3 since it behaves more reasonably for small angles near the line of sight.

Both of the foregoing empirical equations and their theoretical support have been discussed by Fry in Illumination Engineering 49, 98–102 (February 1954). In addition, these equations have been used to calculate the effect of veiling luminance on eye performance for specific known glare sources under controlled experimental conditions. See Blackwell, Illumination Engineering, 50 286–299 (June 1955). However, as this prior art shows, the only method known to date for evaluating veiling luminance required measurement of each glare source, computation of its veiling luminance effect and summation of the veiling luminance effects of all glare sources. Such prior method for evaluating veiling luminance is feasible under laboratory conditions where at most only a few known glare sources may be used. However, in the field every actual visual environment has literally hundreds of glare sources. Under such circumstances, it has been heretofore obviously impractical to even attempt any direct field measurements of veiling luminance. Consequently, illumination engineers have been forced to rely on empirical rules developed through experience to roughly estimate the proper illumination for the best eye performance.

The present invention for the first time permits one to employ an effective, simple means for instantaneously measuring the integral or summation of all the veiling luminance produced by a visual environment full of many glare sources. The means and method of the present invention permits a single, simple and direct measurement of the disability glare over the whole visual field. Consequently, the veiling luminance effect of disability glare may be measured easily and directly without multiple, cumbersome measurements and computations. Moreover, the present invention may accomplish these results by a photometer means which may be produced simply and inexpensively.

An object of the present invention is to provide a method and means for simply and directly measuring the veiling luminance of disability glare.

Another object of the present invention is to provide a means for directly obtaining the veiling luminance of multiple glare sources by a single measurement.

Still another object of the present invention is to provide a photometer glare lens constructed to directly and simply measure the veiling luminance of multiple glare sources over the whole visual field.

Still another object of the present invention is to provide a simple, inexpensive method of producing the aforementioned photometric glare lens.

In general, the present invention involves a photometer including a glare lens constructed and adapted to refract incident light from sources in spaced relation to its optical axis in proportion to the veiling luminance effect of said light sources on the subject matter being measured, such subject matter being by definition located on the optical axis of said lens.

The present invention also involves a means and method for measuring the veiling luminance effect on the subject matter being measured of light sources other than such subject matter. Such measurement may be done by refracting the light from such other light sources onto the light-sensitive surface of a photometer in proportion to the veiling luminance effect of such light. The intensity of the light received by such light-sensitive surface from said other light sources is then measured.

The present invention also involves a method of making a photometer lens for determining the veiling luminance effect on the subject matter being measured by said photometer of light sources other than said subject matter. Such method includes forming a male mold having an aspherical surface, which in turn forms a mating surface in a lens said lens surface being adapted to refract incident light from sources in spaced relation to its optical axis in proportion to the veiling luminance effect of said light sources on the subject matter being measured. The mold is then heated and forced into the first surface of a blank of the thermoplastic, transparent lens material until the end of the mold is near the flat second surface of such blank so that the surface of said mold is completely imprinted on said first surface. The mold is, of course, at a temperature above the softening temperature of said lens material. Preferably the said flat second surface is perpendicular to the optical axis of the lens formed by the mold on the first surface.

Other objects and advantages of the present invention will be readily apparent from the following description and drawings in which is illustrated an exemplary embodiment of the present invention.

FIG. 1 is a semi-schematic diagram of a photometer system utilizing a specific embodiment of the glare lens of the present invention.

FIG. 2 is a graphical representation of the aspherical surface of the glare lens of FIG. 1.

FIGS. 3–5 show the steps of a process of making the glare lens of FIG. 1.

FIG. 6 shows another specific embodiment of the glare lens of the present invention.

FIG. 7 is a graphical comparison of the computed theoretical values and measured values obtained by the glare lens of FIG. 1.

Figure 8:
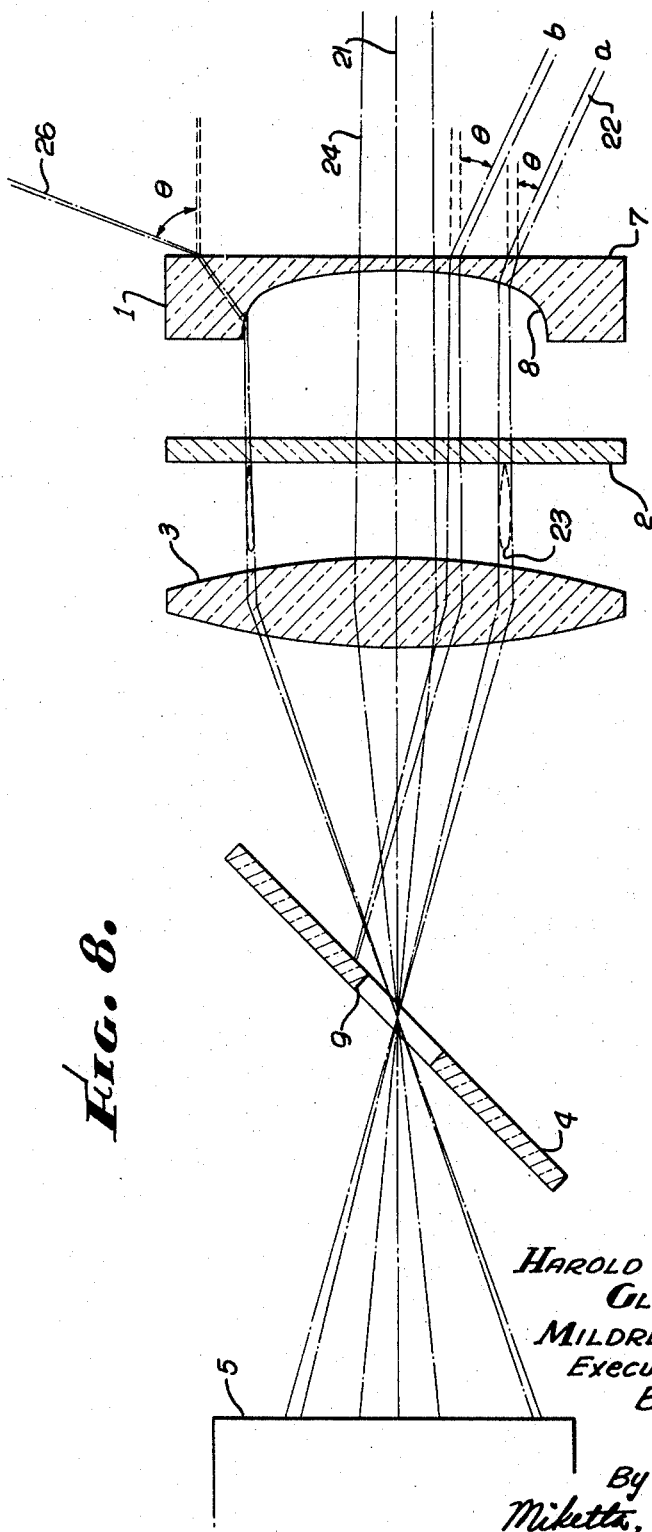
FIG. 8 is an enlarged view of FIG. 1 illustrating light ray transmission zones in a more detailed manner.

The photometer system as shown in FIG. 1 includes a concave glare lens 1, a diffuser plate 2, a focusing or objective lens 3, an aperture plate mirror 4, and a photosensor 5. The glare lens 1 may receive from glare sources on its flat front surface 7 light rays from the entire 180° field of view in front of surface 7, exemplary rays of said field being indicated as $a$, $a'$ and $b$, $b'$. Rays $a$ and $b$, as well as $a'$ and $b'$, are shown as coming from a glare source in substantially parallel relation and at an angle $\theta$ to the axis of the lens, rays $b$, $b'$ being between $a$ and $a'$, and striking surface 7 at a different location or area thereof than rays $a$ and $a'$. At surface 7, rays $a$ and $a'$ are refracted and are transmitted through the lens 1 to surface 8. At surface 8, which is configured as later described exemplary rays $a$ and $a'$ are refracted and directed to objective lens 3 which directs rays $a$ and $a'$ through aperture 9 to photosensor 5 which may be a suitable photo tube, photo multiplier tube or a photo cell. Exemplary rays $b$ and $b'$ which strike surface 7 at the same angle $\theta$ are refracted by lens 1; and at surface 8, because of the difference in curvature of surface 8 at that location, rays $b$, $b'$ are caused to slightly converge. Objective lens 3 directs these rays $b$ and $b'$ to aperture plate 4 at an area other than aperture 9. In this example, such rays $b$ and $b'$ may be directed by the surface of aperture plate 4 to a suitable viewer 6. Rays $b$ and $b'$ are therefore not directed through the aperture 9 and do not fall upon the photosensor 5 and therefore a proportion of the light from the glare source does not affect the response of the photosensor 5. This proportion of light which is transmitted through aperture 9 as exemplarily illustrated by rays $a$, $a'$, and which does not pass through aperture 9 as exemplarily illustrated by rays $b$, $b'$, is determined by and depends upon the shape of aspherical surface 8 which is described in detail hereafter.

The shape of aspherical surface 8 of lens 1 is formed so that the incident light from all glare sources within 180° field and in spaced relation to the optical axis of lens 1 is refracted parallel to the optical axis of lens 1 and is transmitted through aperture 9 in proportion to the veiling luminance effect of such light sources on the subject matter being measured by the photometer system. As already noted, by definition such subject matter is located on the optical axis of lens 1. In other words, for each position of a possible glare source in the visual environment surrounding the subject matter, there is a slope, shape, or configured incremental area on surface 8 which will refract its rays just enough to render them parallel to the optical axis of lens 1 and to pass through the center of aperture 9. If this relationship is derived mathematically for a single ray of light from such glare source; that is, the relation of the shape of surface 8 ($dy/dR$) at this point to the angle of incidence $\theta$ at surface 7, the following equation is obtained:

(4)[1] $$\frac{dy}{dR} = \frac{\sin\theta}{(n^2 - \sin^2\theta)^{1/2} - 1}$$

where $\theta$ = the angle between the optical axis of lens 1 and the light ray in degrees;

$R$ = radial and perpendicular distance from the optical axis of lens 1 to the incremental area on surface 8 abscissa in FIG. 2).

$y$ = distance from the plane passing through the center of surface 8 perpendicular to the optical axis of lens 1 (ordinate in FIG. 2); and $n$ = the refractive index of the lens material.

[1] Equation 4 is derived on the assumption that the refractive index of air is 1.

In addition, an increment of surface area for each slope is selected so that the amount of light refracted substantially parallel to the optical axis of lens 1 is proportional to the veiling luminance effect of such light glare source. If this second relationship is set up mathematically, using Equation 2, the following equation is obtained:

(5)[2] $$R^2 = 2k \int_{\theta=0°}^{\theta=90°} \frac{\sin\theta \cos\theta}{T_1 T_2 \theta (1.5 + \theta)} d\theta$$

where $\theta$ = the angle between the optical axis of lens 1 and the light sources in degrees;

$R$ = radial perpendicular distance of the incremental area from the optical axis of lens 1;

$T_1$ and $T_2$ = the transmittances at the two surfaces of the lens; and $k$ = a proportionality constant relating the luminance of an incremental glare source area to the luminance measured over an incremental area in the plane perpendicular to the optical axis of lens 1 between lens 3 and lens 1. Thus $k$ includes the 9.2 constant of Equation 2, and the overall transmittance of the optical system including reflection at the lens surfaces, absorption and scattering. Proportionality constant $k$ is determined experimentally by relating the reading of a calibrated photometer to the measured luminance of a point glare source at a known angle $\theta$, and is a constant which determines the value of R when $\theta = 90°$.

[2] Equation 5 is in terms of per unit of illumination striking surface 8 in lumens/ft.[2] measured normal to the incoming ray.

If Equation 3 is used for the relationship between glare sources and veiling luminances, then the following equation is obtained:

(6) $$R^2 = 2k \int_{\theta=0°}^{\theta=90°} \frac{\sin\theta \cos\theta}{T_1 T_2 \theta^2} d\theta$$

Equation 6 may be used in place of Equation 5; however, Equation 5 produces superior results at small angles of $\theta$.

The shape of surface 8 is shown in detail in FIG. 2 where the same unit of distance measurement is used for both the $y$ (ordinate) and R (abscissa) scales. The exemplary shape of the surface was computed and determined for the specific lens material used, i.e., Plexiglas having an index of refraction of 1.49. Also, it was assumed that the only loss was by reflection, i.e., there was no appreciable absorption loss or scattering loss. The graph shown in FIG. 2 may be determined by first tabulating values of the integral in Equation 5 for various values of $\theta$ and then computing the corresponding values of R. Then the values of $dy/dR$ from Equation 4 may then be computed for the same values of $\theta$. From values of $dy/dR$, the values of $y$ may then be specified for the computed values of R. The values of $y$ and R represent the shape of surface 8 and are plotted in FIG. 2.

The refracted rays $a$ and $b$ coming from surface 8 of lens 1 then pass through diffuser plate 2. In practice, it is found that to polish surface 8 so that it exactly conforms to the calculated surface is quite expensive and laborious. Surface 8 can be readily formed so that it contains only slight irregularities. The slight variations in rays $a$ and $b$ due to such irregularities can be corrected by passing them through a plate which causes slight diffusion such as diffuser plate 2. Diffuser plate 2 may be made by acid etching a standard glass plate and depositing a coating such as shellac on the etched surface. By properly adjusting the thickness of such coating, the desired amount of diffusion may be obtained. Proper adjustment of the coating is normally done experimentally to insure the proper response of diffuser plate 2.

An exemplary device embodying glare lens 1, diffuser plate 2, objective lens 3, aperture plate 4, and a photosensor 5 arranged as in FIG. 1, may be pointed in a selected direction from a selected location and in a given environment to measure veiling luminance with respect to a select subject to which the device is pointed and which lies on the optical axis of the device. As described above and in accordance with the equations for shaping the aspherical surface 8, incremental areas on surface 8 will refract exemplary light rays $a$, $a'$ from the entire field of view and at angles of $\theta$ from 0° to 90° with respect to the optical axis. The summation of the collected light rays $a$, $a'$, which are a portion of the total refracted light from glare sources, directed and passing through aperture 9 will fall upon the photosensor 5. The other portion of refracted light, that is, such as rays $b$, $b'$, strike plate 4 and are not measured by photosensor 5. The response of photosensor 5 to this summation of a portion of refracted light rays is a measure of the veiling luminance of said subject. Diffuser plate 2 is used in the above combination to smooth out minute imperfections in the material of the glare lens as a result of shaping or configuring the surface 8.

To explain in further detail the manner in which glare lens 1 and particularly the curvature of surface 8 functions to selectively integrate light rays from glare sources, reference is made to FIG. 8 which is an enlarged FIG. 1 but which illustrates light rays $a$ and $b$ in a slightly different manner. Ray $a$ is shown as a ray bundle at an angle $\theta$ and of an incremental width. At an exemplary distance from the optical axis 21, ray bundle $a$ is refracted by surface 7 over an incremental area which represents the width of an annular transmission zone 22 on surface 7 over which light energy at angle $\theta$ and striking surface 7 as indicated will pass through the aperture 9 to the photosensor 5 and be measured. Ray bundle $a$ is refracted by an incremental surface area on surface 8 which is considered to be plane so that the ray bundle is transmitted parallel to diffuser plate 2 and lens 3. At diffuser plate 2 some scattering of ray bundle $a$ occurs as indicated by dotted lines at 23. Elements of ray bundle $a$ are converged slightly by lens 3, the ray bundle being converged grossly so as to pass through aperture 9 to photosensor 5 for measurement.

As illustrated in FIG. 8, a ray bundle received along the optical axis from the direction of the center of field from which the veiling luminance is to be measured, or when $\theta$ is zero, will have a transmission zone 24 of greater width because the curvature of surface 8 adjacent the optical axis is quite shallow, as best seen in FIG. 2. Elements of the ray bundle along the optical axis and falling within such the transmission zone 24 will be transmitted through the glare lens parallel scattered slightly at the diffuser plate, and then converge slightly so as to pass through the aperture 9 to the photosensor 5.

As angle $\theta$ increases, the width of the annular zone through which light energy is transmitted and passes for measurement purposes decreases, the width of such transmission zone depending upon the curvature of surface 8 configured and shaped as described in the hereinabove equations and as shown in FIG. 2. Thus, a very narrow transmisison zone 26 is illustrated for light rays at angles of $\theta$ greater than the angle of $\theta$ shown for ray $a$.

Thus light rays, from a plurality of glare sources and at various angles of $\theta$ striking surface 7 at the incremental surface areas forming transmission zones as commented upon above, will be transmitted through the optical system and measured to provide an indication of veiling luminance with respect to a subject on the optical axis. However, light rays striking surface 7 at similar various angles of $\theta$ but not at the incremental transmission zones referred to above, that is, outside such transmission zones will not be refracted by surfaces 7 and 8 for transmission through aperture 9 but instead will be directed to aperture plate 4 and thus will not be included in the measurement made by the photosensor 5.

It will thus be apparent that while lens 1 may appear to have some of the characteristics of a negative lens in that surface 8 has a generally concave configuration, surface 8 of lens 1 is not shaped to perform as a negative lens to produce an image. Surface 8 is configured not for image defining purposes, but to integrate and summate light rays from glare sources in a manner which corresponds to the manner in which the human eye integrates and proportions surrounding light when viewing a selected subject. Thus glare lens 1 proportions or weighs the selected light rays $a$, $a'$, $b$, $b'$, etc., so that incremental surface areas forming surface 8 which is computed from the aforesaid equations will measure veiling luminance.

The performance of the system shown in FIG. 1 has been experimentally checked and shown to coincide very closely with theoretical results. The system shown in FIG. 1 was first calibrated using a standard lamp producing an illumination of 10 lumens/ft.[2]. The standard lamp was then located at various angles to the optical axis of the system and veiling luminance was measured for each location, $B_v$ was then computed by use of Equation 2 for each location and the theoretical curve for veiling luminance was drawn from such computed values. FIG. 7 is a graphical comparison of the measured values and computed values for veiling luminance. FIG. 7 shows the excellent agreement between the measured values and computed values for veiling luminance over a wide range of angles.

In FIGS. 3–5, the steps of the preferred method of making glare lens 1 are set forth. FIG. 3 shows a lens blank 11 of thermoplastic transparent lens material such as Plexiglas (methyl methacrylate) having an index of refraction of 1.49. Preferably, lens blank 11 has two flat, parallel surfaces 12 and 13 since such form facilitates the lens-making process. However, lens blank 11 may have only one flat surface 12. FIG. 3 also shows a male mold 14 which has an aspherical surface 15. Surface 15 in a photometer lens is adapted to refract incident light from sources in spaced relation to its optical axis in proportion to the veiling luminance effect of such light sources on subject matter being measured by such photometer. For example, surface 15 may have the shape of the graph shown in FIG. 2. Mold 14 is heated and its temperature maintained above the softening temperature of the lens blank 11. As shown in FIG. 4, mold 14 is then forced into surface 13 of lens blank 11 until surface 15 is near surface 12 of lens blank 11. As shown in FIG. 5, mold 14 is then removed from lens blank 11 leaving a complete imprint 15' of surface 15 on surface 13 of lens blank 11. Preferably, the optical axis of the imprinted surface 15' should be perpendicular to surface 12. In this way, the surface 15' and surface 12 will always refract the same amount of light from a given glare source irrespective of the rotation of the lens about its optical axis.

As shown in FIG. 6, the glare lens of the present invention may be a convex lens 21 with a flat surface 22 and an aspherical surface 23. Surface 23 is configured so that the incident light from all sources in spaced relation to the optical axis of lens 21 is refracted in proportion to the veiling luminance effect of such light on the subject matter on the optical axis of lens 21.

The most important feature of the glare lens of the present invention is that when used in a photometer it refracts incident light from sources in spaced relation to its optical axis in proportion to the veiling luminance effect of such light sources on the subject matter being measured by the photometer onto the light-sensitive surface of a photometer. The intensity of light thus received is then measured by the photometer. The intensity of the veiling luminance then indicates the amount of disability glare which the subject matter is being observed. Knowing this value, it then becomes a relatively straightforward matter to adjust the illumination to minimize the disability glare while obtaining the necessary illumination.

In its simplest form, the glare lens of the present invention may be designed to be combined with a photometer system such as described in FIG. 1. In such form, the glare lens is designed to refract as noted the light from glare source's so that it passes parallel to the optical axis of the glare lens. In such system, the glare lens may be located any convenient distance from the lens system of the photometer system so long as its optical axis is coaxial with the optical axis of the spot photometer's lens system. In addition, in such system, either the concave lens or the convex lens may be reversed so that its curved surface extends toward the light sources being measured. Note that in FIG. 1, the curved surface of the concave glare lens 1 extends away from the light sources being measured. Such reversal is undesirable since the glare lens extending toward the light sources shades the glare lens from light sources which are at large angles to the optical axis of the glare lens.

However, the glare lens of the present invention may be designed in other ways to refract as noted the proper veiling luminance effect onto the light-sensitive surface of a photometer. For example, both the front and back surfaces of the glare lens may be curved to achieve a desired refraction. Even if only a single curved surface is used with a flat surface, the flat surface may be at an angle to the optical axis of the curved surface. Another example is a glare lens set at a fixed distance from the aperture for admitting light to a photometer which has no additional lens system. Such glare lens would be designed to refract as noted the light from glare sources so that it passes at the proper angle to the optical axis of the glare lens to enter the photometer light aperture. It should be noted that to design such additional possible lenses would be considerably more difficult than the relatively simple lens set forth in FIGS. 1 and 2.

The glare lens of the present invention may be formed in any convenient manner. As already noted, it may be formed by molding. Other convenient ways include grinding the lens blank to the desired curvature or casting the lens material such as glass in a form with the desired curvature.

It will be understood that the foregoing description and drawings are only illustrative of the present invention and it is not intended that the invention be limited thereto. Many other specific embodiments of the present invention will be obvious to one skilled in the art in view of this disclosure. All substitutions, alterations and modifications of the present invention which come within the scope of the following claims or to which the present invention is readily susceptible without departing from the spirit and scope of this disclosure are considered part of the present invention.

We claim:

1. In a device for measuring veiling luminance, a combination of: a glare lens having an optical axis and an aspherical refractive surface, said surface including incremental areas to refract incident light from sources in spaced relation to said optical axis to render a portion of said refracted light substantially parallel to its optical axis in proportion to the veiling luminance effect of said light sources with respect to the subject matter being measured, said light sources being located within 90° from the optical axis of said lens; an objective lens to receive refracted light from said glare lens; a photosensor means spaced from said objective lens; and a plate having an aperture at the focal plane of said objective lens for transmitting to the photosensor only refracted light proportionate to the veiling luminance effect of the light source; said aspherical surface being substantially determined by evaluating $y$ and $R$ for various values of $\theta$ in the following equations:

$$R^2 = 2K \int_{\theta=0°}^{\theta=90°} \frac{\sin\theta \cos\theta}{T_1 T_2 \theta(1.5+\theta)} d\theta$$

$$\frac{dy}{dR} = \frac{\sin\theta}{(n^2 - \sin^2\theta)^{1/2} - 1}$$

where $\theta$ = the angle between the optical axis of said lens and the said light sources in degrees;

$R$ = radial perpendicular distance from the optical axis of said lens to said incremental areas;

$y$ = distance from the plane passing through the center of said surface perpendicular to the optical axis of said lens;

$n$ = the refractive index of the lens material; and $T_1$ and $T_2$ = the transmittances at the two surfaces of the lens;

$K$ = a proportionality constant relating the luminance of an incremental source area to the luminance measured over an incremental area in the plane perpendicular to the optical axis of the lens 1 between lens 3 and lens 1, and when $\theta=90°$, the constant determines the value of $R$.

2. A lens as stated in claim 1 wherein the distance $y$ is measured in the opposite direction from the incident light being measured.

3. A glare lens as stated in claim 1 wherein the lens includes a lens body of thermoplastic transparent material, said lens body having a planar front refractive surface.

4. In combination with a glare lens as stated in claim 1, a diffuser plate adjacent said glare lens to receive and slightly scatter light refracted from said glare lens.

5. In a means for measurement of the veiling luminance effect of light sources which produce glare or the like, the combination of: a glare lens including an aspherical refractive surface to refract light substantially parallel to the optical axis of the glare lens; said aspherical surface being substantially determined by evaluating $y$ and $R$ for various values of $\theta$ in the following equations:

$$R^2 = 2K \int_{\theta=0°}^{\theta=90°} \frac{\sin\theta \cos\theta}{T_1 T_2 \theta(1.5+\theta)} d\theta$$

$$\frac{dy}{dR} = \frac{\sin\theta}{(n^2-\sin^2\theta)^{1/2}-1}$$

where $\theta$ = the angle between the optical axis of said lens and the said light sources in degrees;

$R$ = radial perpendicular distance from the optical axis of said lens to said incremental areas;

$y$ = distance from the plane passing through the center of said surface perpendicular to the optical axis of said lens;

$n$ = the refractive index of the lens material;

$T_1$ and $T_2$ = the transmittances at the two surfaces of the lens; and $K$ = a proportionality constant relating the luminance of an incremental source area to the luminance measured over an incremental area in the plane perpendicular to the optical axis of the lens 1 between lens 3 and lens 1, and when $\theta=90°$, the constant determines the value of $R$;

an aperture plate spaced from said glare lens and having an aperture of selected size; an objective lens between the aperture plate and the glare lens for receiving refracted light beams and for directing those light beams refracted in proportion to the veiling luminance effect through said aperture and for directing other refracted light beams against said aperture plate; and photosensory means for receiving and measuring the refracted light beams which pass through said aperture.

References Cited
UNITED STATES PATENTS 3,121,170  2/1964  Norwood _____ 250—229
3,134,021  5/1964  Ploke.

JEWELL H. PEDERSEN, *Primary Examiner.*

JOHN CORBIN, *Examiner.*